United States Patent
Chunduri et al.

(10) Patent No.: US 11,593,252 B2
(45) Date of Patent: Feb. 28, 2023

(54) AGENTLESS DISTRIBUTED MONITORING OF MICROSERVICES THROUGH A VIRTUAL SWITCH

(71) Applicant: Cisco Technology, Inc., San Jose, CA (US)

(72) Inventors: Kiran Chunduri, Cupertino, CA (US); Rajasekhar Manam, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/551,680

(22) Filed: Dec. 15, 2021

(65) Prior Publication Data
US 2022/0107881 A1 Apr. 7, 2022

Related U.S. Application Data

(63) Continuation of application No. 16/692,950, filed on Nov. 22, 2019, now Pat. No. 11,210,204, which is a continuation of application No. 15/299,397, filed on Oct. 20, 2016, now Pat. No. 10,489,275.

(51) Int. Cl.
| | |
|---|---|
| *G06F 11/36* | (2006.01) |
| *G06F 11/34* | (2006.01) |
| *H04L 67/30* | (2022.01) |
| *H04L 67/51* | (2022.01) |

(52) U.S. Cl.
CPC .......... *G06F 11/3664* (2013.01); *G06F 11/34* (2013.01); *H04L 67/30* (2013.01); *H04L 67/51* (2022.05)

(58) Field of Classification Search
CPC ................................................... G06F 11/3664
See application file for complete search history.

(56) References Cited

U.S. PATENT DOCUMENTS

| | | | |
|---|---|---|---|
| 5,621,728 A | * | 4/1997 | Lightfoot ........... H04Q 11/0478 348/E7.071 |
| 8,990,799 B1 | | 3/2015 | Forecast |
| 9,178,828 B2 | | 11/2015 | Kumar et al. |
| 9,716,617 B1 | | 7/2017 | Ahuja et al. |
| 9,875,086 B1 | | 1/2018 | Anderson et al. |
| 2005/0065852 A1 | | 3/2005 | Bross et al. |
| 2014/0321459 A1 | | 10/2014 | Kumar et al. |
| 2015/0195137 A1 | | 7/2015 | Kashyap et al. |
| 2016/0112475 A1 | | 4/2016 | Lawson et al. |
| 2016/0124742 A1 | | 5/2016 | Rangasamy et al. |
| 2016/0269425 A1 | | 9/2016 | Shieh et al. |
| 2016/0269482 A1 | * | 9/2016 | Jamjoom ............ H04L 67/1095 |
| 2016/0380916 A1 | | 12/2016 | Gnaneswaran et al. |
| 2017/0155724 A1 | | 6/2017 | Haddad et al. |

(Continued)

*Primary Examiner* — Jae U Jeon
(74) *Attorney, Agent, or Firm* — Polsinelli

(57) ABSTRACT

Disclosed are systems, computer-readable media and methods for monitoring performance data across microservices. One example method includes establishing a service policy configured on a centralized switch controller, applying the service profile to a virtual interface associated with a microservice, mapping a microservice name for the microservice to an IP address and a port number, tracking a protocol flow for the microservice, wherein the protocol flow is associated with a virtual switch, to yield data, aggregating the data to yield aggregated data and presenting the aggregated data on a user interface.

20 Claims, 3 Drawing Sheets

(56) References Cited

U.S. PATENT DOCUMENTS

| | | |
|---|---|---|
| 2017/0160880 A1 | 6/2017 | Jose et al. |
| 2017/0185436 A1 | 6/2017 | Deng et al. |
| 2017/0187785 A1 | 6/2017 | Johnson et al. |
| 2017/0195360 A1 | 7/2017 | Harter et al. |
| 2017/0201425 A1 | 7/2017 | Marinelli et al. |
| 2018/0004946 A1 | 1/2018 | LeMay et al. |
| 2018/0019948 A1 | 1/2018 | Patwardhan et al. |
| 2018/0024918 A1 | 1/2018 | Agarwal et al. |
| 2018/0034832 A1 | 2/2018 | Ahuja et al. |
| 2018/0034833 A1 | 2/2018 | Ahuja et al. |
| 2018/0034839 A1 | 2/2018 | Ahuja et al. |
| 2018/0107586 A1 | 4/2018 | Vyas et al. |
| 2018/0152534 A1 | 5/2018 | Kristiansson et al. |
| 2019/0123370 A1 | 4/2019 | Mayur Siddharth et al. |
| 2019/0123970 A1* | 4/2019 | Rastogi ............... H04L 41/0893 |

\* cited by examiner

AGENTLESS DISTRIBUTED MONITORING OF MICROSERVICES THROUGH A VIRTUAL SWITCH

CROSS-REFERENCE TO RELATED APPLICATIONS

This application is a continuation of U.S. Non-Provisional patent application Ser. No. 16/692,950, filed Nov. 22, 2019, which is a continuation of U.S. Non-Provisional patent application Ser. No. 15/299,397, filed Oct. 20, 2016, now U.S. Pat. No. 10,489,275, the contents of which are incorporated herein by reference in their entireties.

TECHNICAL FIELD

The present disclosure pertains to configuring a service policy on a controller and using the service policy for tracking microservice flows on a virtual switch on compute nodes.

BACKGROUND

The current trend for deploying software applications is to architect Web Applications using a distributed microservices model. The microservice architecture, or simply microservices, is a particular method of developing software systems that has grown in popularity in recent years. Many developers have adopted this approach as a preferred way of creating enterprise applications. Thanks to its scalability, this architectural method is considered particularly ideal when developers have to enable support for a range of platforms and devices—spanning web, mobile, the Internet of Things, and wearables. If the developer is not sure of the types of devices for which support will be needed, then this model is also preferable.

While there is no standard, formal definition of microservices, there are certain characteristics that help us identify the style. Essentially, microservice architecture is a method of developing software applications as a suite of independently deployable, small, modular services in which each service runs a unique process and communicates through a well-defined, lightweight mechanism to serve a business goal.

When compared to a monolithic style, which is essentially the opposite of the distributed microservices model, the microservices model gives a clear path for an application to scale, and is easy to manage and develop as a set of independent services. Each service is managed independently and can be deployed on a number of Nodes (virtual machines or containers) and the data location is also dispersed. Large scale web applications have adopted this model. In the microservice design model, a typical client request will land in an 'API Gateway Node'. The API Gateway Node further requests data from 10-100 of the microservices to generate a rendered Dynamic Web-Page. The services interact with each other or the API Gateway Node either using REST-API or a Message-based AMQP such as the RabbitMQ/ZeroMQ protocols.

The distributed nature of this model makes it difficult for the users/administrators to get centralized visibility into resource usage of each microservice and its behavior. For example, data such as the Service Request Response time, Request Rate, CPU/Mem Utility, etc., are difficult to view. Having visibility into each of these factors helps in resource planning for each service, and determining which services are better to be co-located in the enterprise and which can be hosted on a public cloud.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
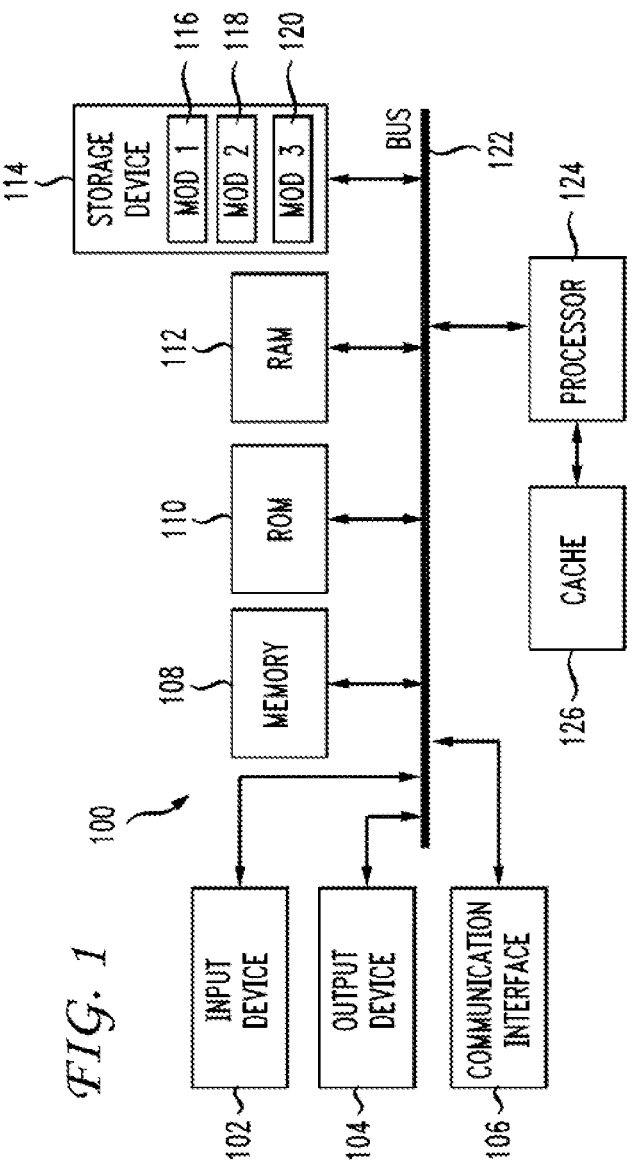
FIG. 1 illustrates a system embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

In the present disclosure, it is assumed that each of the microservices will be packaged as a virtual machine/container instance and multiple instances will be deployed for throughput and availability. In addition, each of the instances will be behind a virtual switch for network access.

Compared to virtual machines (VMs), containers are lightweight, quick and easy to spawn and destroy. With the increasing interest in container-based deployments, the network has to adapt to container-specific traffic patterns. Container technology, such as DOCKER and LINUX CONTAINERS (LXC), is intended to run a single application and does not represent a full-machine virtualization. A container can provide an entire runtime environment: an application, plus all its dependencies, libraries and other binaries, and configuration files needed to run it, bundled into one package. By containerizing the application platform and its dependencies, differences in operating system distributions and underlying infrastructure are abstracted away.

With virtualization technology, the package that can be passed around is a virtual machine and it includes an entire operating system as well as the application. A physical server running three virtual machines would have a hypervisor and three separate operating systems running on top of it. By contrast, a server running three containerized applications as with DOCKER runs a single operating system, and each container shares the operating system kernel with the other containers. Shared parts of the operating system are read only, while each container has its own mount (i.e., a way to access the container) for writing. That means the containers are much more lightweight and use far fewer resources than virtual machines.

Other containers exist as well such as the LXC that provide an operating-system-level virtualization method for running multiple isolated Linux systems (containers) on a control host using a single Linux kernel. These containers are considered as something between a chroot (an operation that changes the apparent root directory for a current running process) and a full-fledged virtual machine. They seek to create an environment that is as close as possible to a Linux installation without the need for a separate kernel.

The present disclosure can apply to any definition of a "container." This disclosure focuses on containers and how to provide improvements to managing the processing of applications within containers.

There are several existing mechanisms that seek to solve the problem if dealing with the distributed nature of the microservices model. Amazon EC2 (CloudWatch), Ruxit, NginxPlus, and AppDynamics are all applications that seem to be providing VM/Application monitoring ability. But these mechanisms are either agent-based and need agents installed inside the VM or the host, or are based on the application logs. The approach disclosed herein to address this issue is to make use of virtual switch present on the compute and gateway nodes to gather information of each microservice instance (explained below) without any agents inside the VM/host. In addition, the microservices awareness does not exist in any of virtual switches today.

Disclosed are systems, methods, and computer-readable storage media for tracking different protocol flows for a microservice or microservices and aggregating the data for presentation through a user interface. One example method includes establishing a service policy configured on a centralized switch controller virtual supervisor module, applying the service policy to a virtual interface associated with a microservice, mapping a microservice name for the microservice to an IP address and a port number, tracking a protocol flow for the microservice, wherein the protocol flow is associated with a virtual switch, to yield data, aggregating the data of microservice flows to yield aggregated data and presenting the aggregated data on a user interface on the centralized controller.

An advantage of the proposed approach is that it eliminates the need for any monitor agents inside the VM/Host. The approach can use the existing virtual switch to track/monitor the service network performance and the associated VM CPU/Mem utilization. The microservices awareness does not exist in any of virtual switches today and thus the disclosed concepts provide an improvement and a novel feature over existing solutions.

DETAILED DESCRIPTION

Disclosed are systems, method, and computer-readable media for agentless distributed monitoring of microservices through a virtual switch.

The disclosure first turns to FIG. 1, which illustrates a system bus computing system architecture 100 wherein the components of the system are in electrical communication with each other using a bus 122. Exemplary system 100 includes a processing unit (CPU or processor) 124 and a system bus 122 that couples various system components including the system memory 108, such as read only memory (ROM) 110 and random access memory (RAM) 112, to the processor 124. The system 100 can include a cache of high-speed memory connected directly with, in close proximity to, or integrated as part of the processor 124. The system 100 can copy data from the memory 108 and/or the storage device 114 to the cache 126 for quick access by the processor 124. In this way, the cache can provide a performance boost that avoids processor 124 delays while waiting for data. These and other modules can control or be configured to control the processor 124 to perform various actions. Other system memory 108 may be available for use as well. The memory 108 can include multiple different types of memory with different performance characteristics. The processor 124 can include any general purpose processor and a hardware module or software module, such as module 1 116, module 2 118, and module 3 120 stored in storage device 114, configured to control the processor 124 as well as a special-purpose processor where software instructions are incorporated into the actual processor design. The processor 124 may essentially be a completely self-contained computing system, containing multiple cores or processors, a bus, memory controller, cache, etc. A multi-core processor may be symmetric or asymmetric.

To enable user interaction with the computing device 100, an input device 102 can represent any number of input mechanisms, such as a microphone for speech, a touch-sensitive screen for gesture or graphical input, keyboard, mouse, motion input, speech and so forth. An output device 104 can also be one or more of a number of output mechanisms known to those of skill in the art. In some instances, multimodal systems can enable a user to provide multiple types of input to communicate with the computing device 100. The communications interface 106 can generally govern and manage the user input and system output. There is no restriction on operating on any particular hardware arrangement and therefore the basic features here may easily be substituted for improved hardware or firmware arrangements as they are developed.

Storage device 114 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 112, read only memory (ROM) 110, and hybrids thereof.

The storage device 114 can include software modules 116, 118, 120 for controlling the processor 124. Other hardware or software modules are contemplated. The storage device 114 can be connected to the system bus 122. In one aspect, a hardware module that performs a particular function can include the software component stored in a computer-readable medium in connection with the necessary hardware components, such as the processor 124, bus 122, display 104, and so forth, to carry out the function.

In some embodiments the computer-readable storage devices, mediums, and memories can include a cable or wireless signal containing a bit stream and the like.

For clarity of explanation, in some instances the present technology may be presented as including individual functional blocks including functional blocks comprising devices, device components, steps or routines in a method embodied in software, or combinations of hardware and software.

Figure 2:
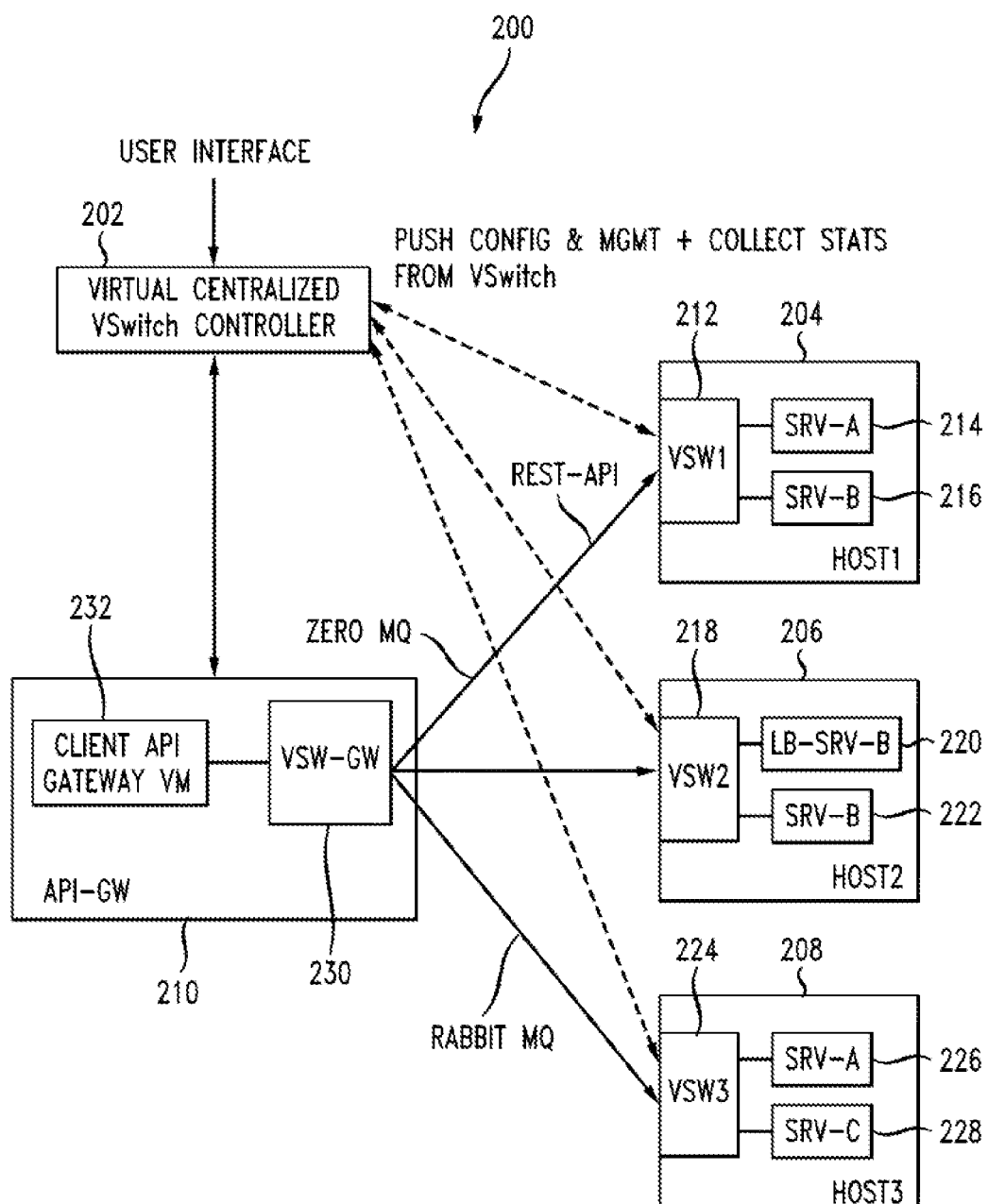
FIG. 2 illustrates a schematic diagram of data communications during a switch upgrade process.

FIG. 2 illustrates an example configuration 200 which includes configuring a service policy on the controller (such as a virtual switch controller) 202 and for tracking the microservice requests on the Virtual Switch 212, 218, 224 on the compute nodes 204, 206, 208. Example microservices are shown in FIG. 2, such as SRV-A (214, 226), which could be, for example, a product information service and SRV-B (216, 222) which could be a recommendation service, and SRV-C (228) which could be a shipping service. Note also LB-SRV-B (220). The SRV-A (214, 226) is distributed across host 1 204 and host 3 208. SRV-B (216, 222) is distributed across host 1 204 and host 2 206.

The following is an example policy definition on the virtual switch controller 202:

Macro-service-group policy <policy-name>
Service-name {<all>|<srv-name1>, <srv-name2> . . . <srv-name-n>
Service-db-ip<ip1>:<port>--->

For example, the service database ip address and port could relate to a service database such as the 'etcd' database in a Kubernetes Cluster Management mechanism. The policy could include other parameters such as:

Port-Profile <p-name>------>
Macro-service-group policy <policy-name>

The port profile identified above is applied to virtual interface of the API Gateway (or Virtual Switch Gateway) 230 or on the node 204, 206, 208 where the microservice is running. When the configuration is applied, the mapping from the microservice 'Name' to the 'IP address and TCP: Port number' is done by querying the "etcd" database or other container orchestration tools like Kubernetes. The lookup function will resolve the 'Service Name' to the Port Number Mapping using this mechanism.

It is assumed that the microservice containers will be running inside the VM whose virtual interfaces will be hosted on the respective virtual switch 212, 218, 224. The virtual switch 230 will track the new connection requests to each microservice port originating from API-Gateway VM 232 in the gateway host 210. The requests typically will be of the kind HTTP-REST/AMQP. These may be TCP-based requests. The virtual switch 230 measures various TCP and HTTP connection statistics, such as one or more of: Connection-EST time/HTTP-Response Time/HTTP-Error codes/TCPRetransmissions, including AMQP:ZeroMQ/RabbitMQ statistics. These statistics will be from the perspective of Gateway-VM 232.

In addition, the virtual switches 212, 218, 224 on other compute nodes 204, 206, 208 gather one or more parameters at each VM such as each of the VM's CPU and memory utilization. Other parameters associated with the system are also contemplated as being gathered and any such parameter is included within the scope of this disclosure, Instead of doing this on all compute nodes all the time, the sampling time can be either configured or, if the Gateway-virtual switch 230 detects that certain service VM parameters (i.e., one or more of a response time, a retransmission rate, etc.) are above a certain threshold, data can be sampled on demand basis. This information is either exchanged with virtual switch 230 on the Gateway Node 210 or with the virtual switch controller 202.

The gathered information is made available to the user through the virtual switch controller 202. The information can be aggregated and presented at service level. The proposed approach is to make use of virtual switch present on the compute nodes 204, 206, 208 and gateway node 210 to monitor performance of each microservice instance without any agents inside the VM/host.

To be more specific, the process tracks the protocol flows (TCP/HTTP/AMQP) corresponding to microservices 214, 216, 220, 222, 226, 228 at the virtual switches 212, 218, 224 on the originating node (API Gateway) 210. Extend the protocol to the virtual switches 212, 218, 224 where the service VM is actually running to get more details of one or more parameters such as the VM CPU/Memory utilization.

The protocol includes making these details available at the service level through Controller/REST-API means, for example, to a user interface.

Figure 3:
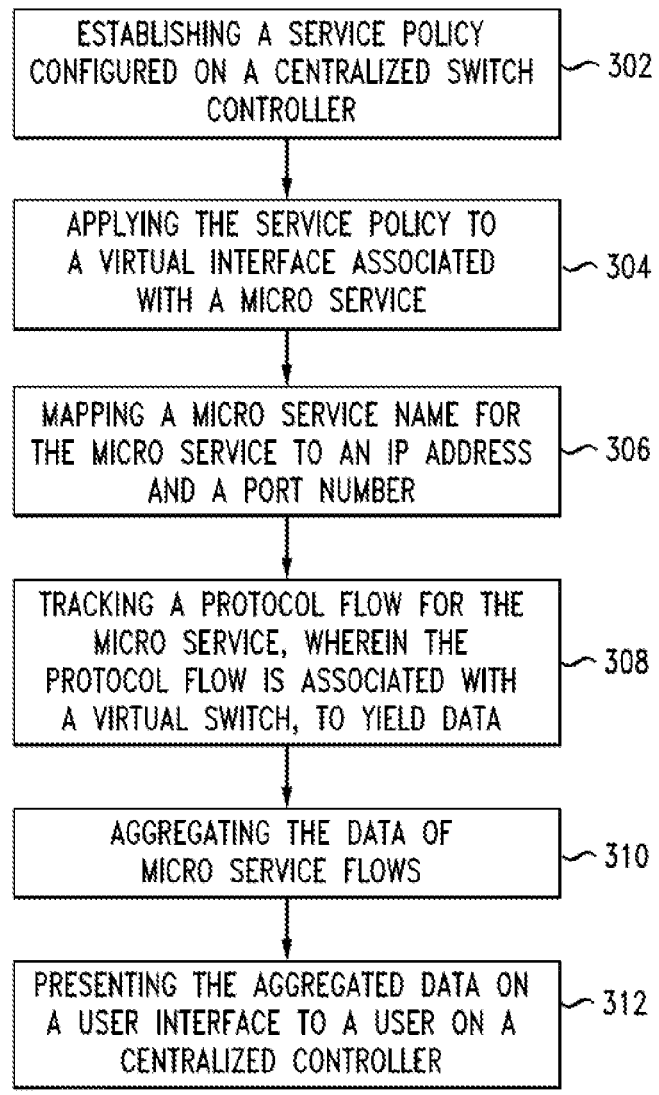
FIG. 3 illustrates an example method for performing a switch update.

FIG. 3 illustrates an example method embodiment. This example method includes establishing a service policy configured on a centralized switch controller (302), applying the service policy to a virtual interface associated with a microservice (304), mapping a microservice name for the microservice to an IP address and a port number (306), tracking a protocol flow for the microservice, on a virtual switch, to yield data (308), aggregating the data of microservice flows to yield aggregated data (310) and presenting the aggregated data of each micro service to a user (312). The presenting can occur on or via a centralized controller or the centralized switch controller. The interface can be graphical, audible, video or any other type of interface. The virtual interface associated with the microservice can include a virtual switch 212, 218, 224. The data can include one or more of a virtual machine central processing unit utilization and memory utilization. The data can be associated with system utilization for the microservice.

In another aspect, the method can include applying a respective service profile for each respective virtual interface associated with a plurality of microservices, as is shown in FIG. 2. The virtual centralized switch controller 202 that provides configuration and management data to each respective virtual interface 212, 218, 224 associated with the plurality of microservices and collects statistics from each respective virtual interface.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Moreover, claim language reciting "at least one of" a set indicates that one member of the set or multiple members of the set satisfy the claim. For example, claim language reciting "at least one of A and B" can include A only, B only, or A and B.

What is claimed is:

1. A method to track flow, the method comprising:
mapping, at a gateway based on a policy, a microservice to an Internet Protocol address and a port number, wherein the microservice is running at least on a node and the mapping includes at least querying to resolve the microservice to the port number;
tracking, by the gateway, a flow, originating at the gateway for the microservice to yield utilization data, wherein the node and the gateway are different;
sending the utilization data for presentation on a user interface.

2. The method of claim 1,
wherein,
the microservice is associated with the policy,
the policy is configured on a centralized switch controller and applied to a virtual interface associated with the microservice, and
the centralized switch controller provides configuration and management data to the virtual interface.

3. The method of claim 1,
wherein,
the microservice is associated with the policy,
the policy is configured on a centralized switch controller, and
the centralized switch controller includes a virtual centralized switch controller.

4. The method of claim 3, wherein the virtual centralized switch controller is configured to provide configuration and management data to each respective virtual interface associated with a plurality of micro services.

5. The method of claim 1, wherein the gateway and the node each host a virtual switch and the tracking is performed by the virtual switch at the gateway.

6. The method of claim 1, wherein the utilization data is associated with system utilization for the microservice.

7. The method of claim 1, further comprising:
applying a respective port profile for each respective virtual interface associated with a plurality of micro services.

8. A system configured to track flow, the system comprising:
one or more processors; and
one or more computer-readable storage devices having stored therein instructions which, when executed by the one or more processors, cause the one or more processors to:
map, based on a policy, a microservice to Internet Protocol address and a port number, wherein the microservice is running at least on a node and the mapping includes at least querying to resolve the microservice to the port number;
track, by the system, a flow, originating at the system, for the microservice to yield utilization data, wherein the node and the system are different; and
send the utilization data for presentation on a user interface.

9. The system of claim 8,
wherein,
the microservice is associated with the policy,
the policy is configured on a centralized switch controller and applied to a virtual interface associated with the microservice, and
the centralized switch controller is configured to provide configuration and management data to the virtual interface.

10. The system of claim 8,
wherein,
the microservice is associated with the policy,
the policy is configured on a centralized switch controller, and
the centralized switch controller includes a virtual centralized switch controller.

11. The system of claim 10, wherein the virtual centralized switch controller is configured to provide configuration and management data to each respective virtual interface associated with a plurality of micro services.

12. The system of claim 8, wherein the utilization data includes virtual machine central processing unit utilization and/or memory utilization.

13. The system of claim 8, wherein the utilization data is associated with system utilization for the microservice.

14. The system of claim 8, wherein the system and the node each host a virtual switch and the tracking is performed by the virtual switch at the system.

15. A non-transitory computer-readable storage medium having stored therein instructions which, when executed by a processor of a gateway, cause the processor to:
map, based on a policy, a microservice to an Internet Protocol address and a port number, wherein the microservice is running at least on a node and the mapping includes at least querying to resolve the microservice to the port number;
track, by the gateway, a flow, originating at the gateway, for the microservice to yield utilization data, wherein the node and the gateway are different; and
send the utilization data for presentation on a user interface.

16. The non-transitory computer-readable storage medium of claim 15,
wherein,
the microservice is associated with the policy,
the policy is configured on a centralized switch controller and applied to a virtual interface associated with the microservice, and
the centralized switch controller provides configuration and management data to the virtual interface.

17. The non-transitory computer-readable storage medium of claim 15,
wherein, the microservice is associated with the policy,
the policy is configured on a centralized switch controller, and
the centralized switch controller includes a virtual centralized switch controller.

18. The non-transitory computer-readable storage medium of claim 15, wherein the gateway and the node each host a virtual switch and the tracking is performed by the virtual switch at the gateway.

19. The non-transitory computer-readable storage medium of claim 15, wherein the utilization data includes virtual machine central processing unit utilization and/or memory utilization.

20. The non-transitory computer-readable storage medium of claim 15, wherein the utilization data is associated with system utilization for the microservice.

\* \* \* \* \*